July 11, 1967        J. W. SEAMAN        3,330,371

COMPACT POWER UNIT FOR GOLF BAG CART

Filed April 12, 1965        4 Sheets-Sheet 1

INVENTOR
JOSEPH W. SEAMAN,

ATTORNEYS.

July 11, 1967  J. W. SEAMAN  3,330,371
COMPACT POWER UNIT FOR GOLF BAG CART
Filed April 12, 1965  4 Sheets-Sheet 2

INVENTOR
JOSEPH W. SEAMAN,
BY Jungblut, Melville
Strasser & Foster
ATTORNEYS.

July 11, 1967   J. W. SEAMAN   3,330,371
COMPACT POWER UNIT FOR GOLF BAG CART
Filed April 12, 1965   4 Sheets-Sheet 3

INVENTOR.
JOSEPH W. SEAMAN,
BY Jungblut, Melville
Strasser & Foster
ATTORNEYS

United States Patent Office 3,330,371
Patented July 11, 1967

3,330,371
COMPACT POWER UNIT FOR GOLF BAG CART
Joseph W. Seaman, Boca Raton, Fla., assignor to The Golf-Burro Company, Boca Raton, Fla., a corporation of Florida
Filed Apr. 12, 1965, Ser. No. 447,151
15 Claims. (Cl. 180—11)

This invention relates to a power unit for a golf bag cart and has to do more particularly with a compact, self-contained driving unit powered by an electric motor, the unit being provided with attachment means by which it may be connected to any standard golf bag cart.

A principal object of the instance invention is to provide a power unit which may be easily handled by the user and readily attached to any conventional hand-powered cart, thereby converting the cart into a self-powered unit.

A further object of the instant invention is the provision of a power unit in which the motor drive, the battery, and the rheostat control are brought together in close proximity in a single enclosure or housing, yet the arrangement of parts is such that the operating components which are subject to wear are readily accessible to the user and hence can be adjusted or replaced with a minimum of effort.

A further object of the invention is the provision of a power unit of the character described which incorporates a rheostat control which embodies a running circuit, a braking circuit and, if desired, a separate timer controlled running circuit. In addition, the rheostat control, while located in the compact housing along with the motor drive and battery, is nonetheless capable of being remotely controlled by the user from a simple control lever mounted on the handle of the golf bag cart.

Still a further object of the instant invention is the provision of a power unit of the character described wherein the power drive unit, including the electric motor, is mounted so as to float on the main wheel shaft, thereby simplifying the construction and eliminating the necessity for aligning bearings in the drive unit and the bearings supporting the driving wheels.

Yet another object of the invention is the provision of improved attachment means for connecting the power unit to the golf bag cart, such means being readily adjustable so that the unit can be accommodated to different types of golf bag carts. In addition, the instant invention contemplates the provision of a third wheel adapted to be used in conjunction with the power unit, the third wheel being attachable to the lowermost end of a conventional two-wheeled golf bag cart, thereby providing a tricycle wheel arrangement which permits the cart to run in a straight line when unattended.

The foregoing, together with other objects of the invention which will appear hereinafter or which will be apparent to the skilled worker in the art upon reading this specification, are accomplished by those constructions and arrangements of parts of which certain exemplary embodiments shall now be described.

Reference is made to the accompanying drawings wherein.

Figure 1:
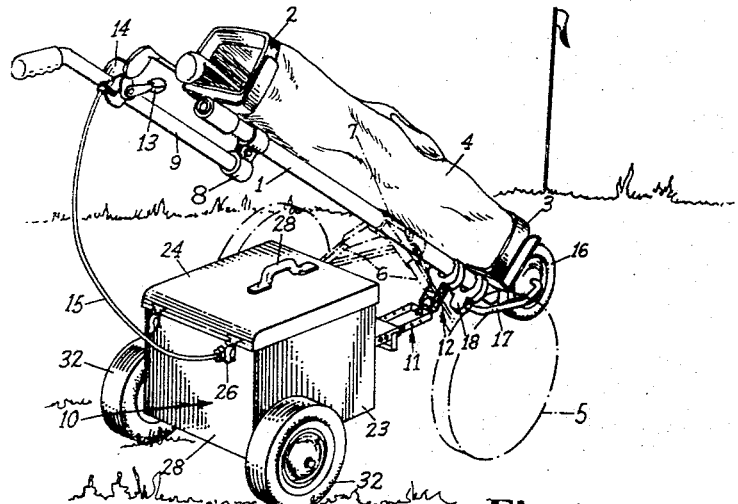
FIGURE 1 is a perspective view illustrating the power unit of the instant invention connected to a conventional golf bag cart.

Referring first to FIGURE 1 of the drawings, the conventional golf bag cart comprises a main frame 1 having bag supporting brackets 2 and 3 at its upper and lower ends, respectively, so as to support a golf bag 4. The frame 1 is supported by a pair of spaced apart wheels 5 rotatably mounted on the free ends of leg members 6 connected to the main frame 1 by means of brackets 7. Depending upon the nature of the cart, the bracket means 7 may either rigidly mount the legs 6 or mount them for pivoting movement so that they may be collapsed relative to the main frame. A bracket 8 is secured to the uppermost end of the main frame 1, the bracket mounting an elongated handle 9 which is preferably pivotally secured to the bracket for movement from an extended to a collapsed position. The bag cart just described is typical of conventional hand carts of the type which can be powered by the power unit of the instant invention; and it is to be understood from the outset that the particular construction of the cart does not constitute a limitation on the invention.

The power unit, indicated generally at 10, has a forwardly projecting tongue 11 operatively connected to attachment bracket 12 secured to the frame 1 adjacent its lowermost end. A control lever 13 is mounted toward the outermost end of handle 9 by means of mounting bracket 14 secured to the handle 9, the lever 13 being operatively connected to a control cable 15 which extends to the power unit and is connected to the rheostat control which will be described hereinafter. Normally, the golf bag cart will be supported by the wheels 5 and legs 6 with the lowermost bag supporting bracket 3 seated on the ground, and when the user desires to either push or pull the cart, the handle 9 would be grasped and moved downwardly a distance sufficient to tilt the cart so that it is supported solely by the two wheels, whereupon it may be either pushed or pulled as desired. However, in accordance with the instant invention, a guide wheel 16 may be provided to support the lowermost end of the main frame, the wheel 16 being mounted on an arm 17 connected to the frame 1 by means of bracket 18. The guide wheel thus serves to form a tricycle arrangement with the wheels 5, thereby permitting the power unit to drive the cart without the necessity for the user holding onto the handle.

Figure 2:
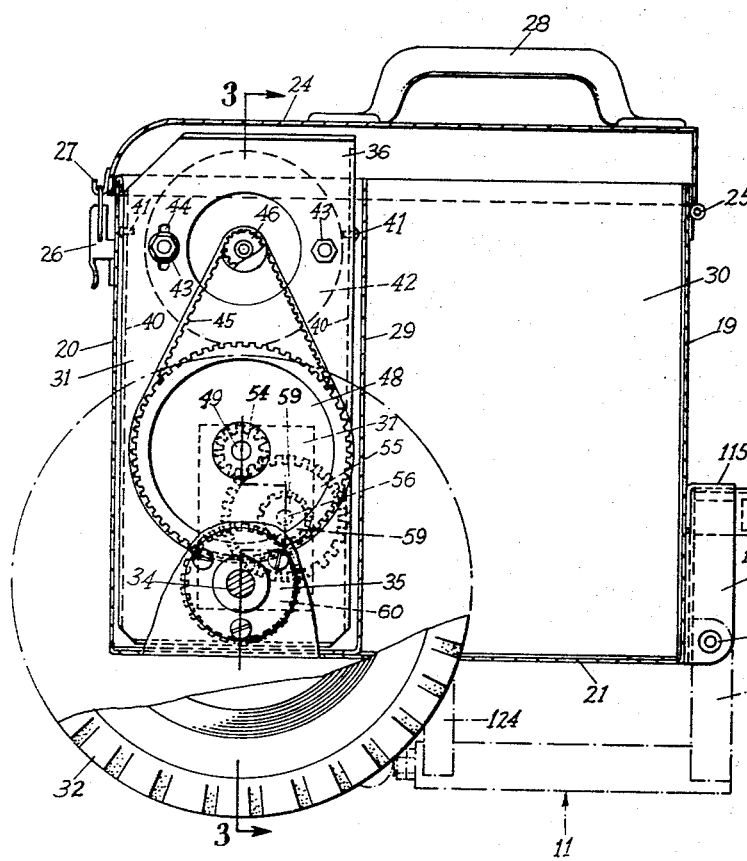
FIGURE 2 is a side elevational view of the power unit with the attachment tongue shown in its alternate positions of use and with certain parts of the drive unit shown in dotted lines.
Figure 3:
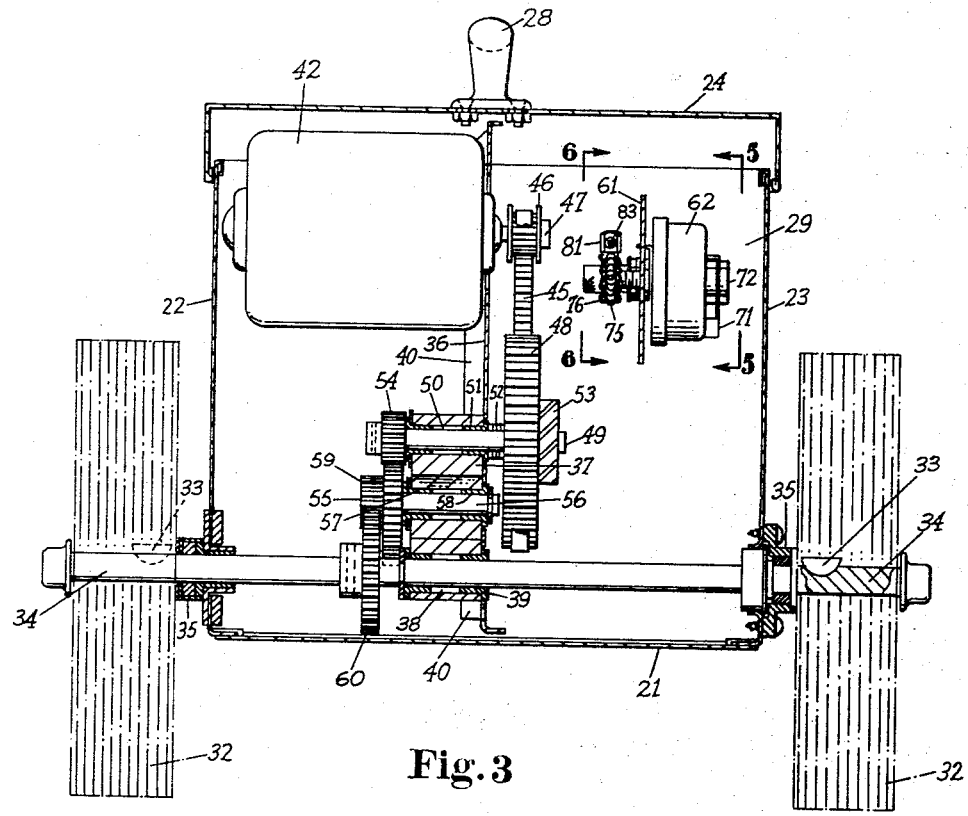
FIGURE 3 is a vertical sectional view taken along the line 3—3 of FIGURE 2.

Referring now to FIGURES 2 and 3 of the drawings, the power unit comprises a generally rectangular housing composed of a front wall 19, a rear wall 20, a bottom 21, and opposite side walls 22 and 23. The open top of the housing is closed by a cover 24 which is hingedly connected to the front wall 19 by means of hinge 25, the rear wall 20 of the housing mounting one or more latches 26 which engage hook portions 27 secured to the cover, thereby locking the cover to the housing while at the same time permitting the cover to be opened to gain access to the interior of the housing. Preferably, the cover is provided with a handle 28 which may be used both to open the cover and as a convenient means for lifting the power unit.

The housing is divided interiorly by a transverse partition wall 29 into a forward battery compartment 30 and a rearward drive unit and rheostat control compartment 31. The dimensions of the housing are such that the forward compartment 30 will just nicely receive a battery (not shown) and the rearward compartment the drive unit and rheostat control, the latter parts being so arranged within the rearward compartment that the user may gain access to adjust or replace any parts which would normally require replacement, such as the drive belt between the motor and the gear train. Yet the arrangement is such that the battery, the drive unit and the control unit are in extremely close proximity one to the other, which not only provides for a compact assembly but additionally increases the over-all efficiency of the unit. That is, electrical circuits on the order of 12 volts— which is preferred—are severely affected from the standpoint of efficiency by the length of the conductors connecting the various components together. The arrangement of parts within the housing brings all of the electrical components within minimum electrical conducting distance, thereby permitting use of the smallest possible electrical conductors which act to materially increase the efficiency of the electrical circuits. At the same time, the partition 29 serves to isolate the battery from the operating components of the power unit, thereby preventing the battery electrolyte from contaminating or otherwise interfering with the operation of the drive mechanism and the rheostat control in spite of their close proximity to the battery.

The housing just described is supported by a pair of driving wheels 32 secured by keys 33 to main shaft 34 which extends transversely through the housing, being journaled in bearing assemblies 35 secured to opposing side walls 22 and 23 of the housing.

The entire driving unit is effectively suspended from the main shaft 34 by means of a vertically disposed mounting plate 36 which is arranged to float on the main shaft 34. More specifically, the mounting plate 36 is provided at its lowermost end with a bearing block 37 having a lowermost transverse bore 38 through which the shaft 34 passes, the shaft being rotatably journaled in the bore 38 by means of bearing 39. Thus, the mounting plate 36 is effectively supported by the shaft 34 and is free to float within the compartment 31. However, as will be evident from FIGURE 2, the width of the mounting plate is only slightly less than the width of the compartment and hence will be restrained in either forward or rearward movement by the partition 29 and rear wall 20 of the housing; and to this end the opposite side edges of the mounting plate are provided with flanges 40 having rubber bumpers 41 secured adjacent their upper edges which make resilient contact with the wall 20 and partition 29 depending upon the floating movement of the mounting plate.

A motor 42 is secured to the upper portion of the mounting plate by means of mounting screws 43 and in this connection at least one of the screws will extend through a vertically disposed elongated slot 44 which, when the screw is loosened, will permit the motor to be moved downwardly a distance sufficient to permit removal of the drive belt 45 which extends between the small pulley 46 secured to the drive shaft 47 of the motor and a large pulley wheel 48 secured to power shaft 49, thereby permitting the belt to be readily replaced when worn.

The power shaft 49 is journaled in an upper bore 50 in bearing block 37 by means of bearing 51. Spacers 52 may be provided to space the pulley 48 outwardly into alignment with pulley 46; and preferably the end of shaft 49 projecting beyond the pulley will be provided with an impeller 53 to provide for the circulation of air within the compartment. At its opposite end the shaft 49 mounts a power shaft gear 54 which is in meshing engagement with transfer gear 55 secured to change gear shaft 56 journaled in bearing 57 received in intermediate bore 58 in the bearing block. The change gear shaft 56 also mounts change gear 59 which in turn engages main shaft gear 60 secured to shaft 34. It will thus be apparent that the entire driving unit is effectively mounted on the mounting plate 36 which in turn is supported by the main shaft 34. Such arrangement has been found to be of particular value in that it eliminates the necessity for aligning a number of bearings which would be the case were the drive unit mounted independently of the main shaft.

Figure 5:
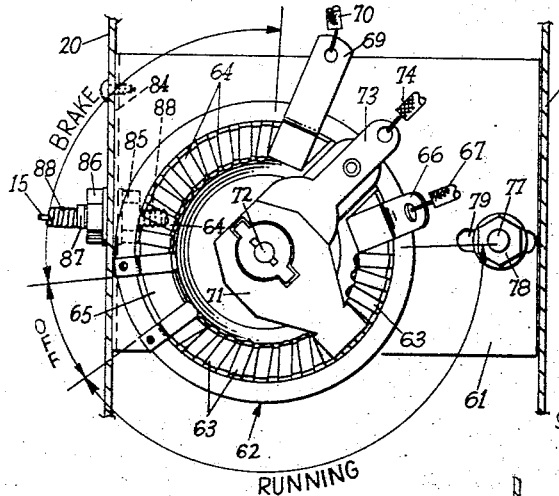
FIGURE 5 is an enlarged fragmentary sectional view taken along the line 5—5 of FIGURE 3.
Figure 9:
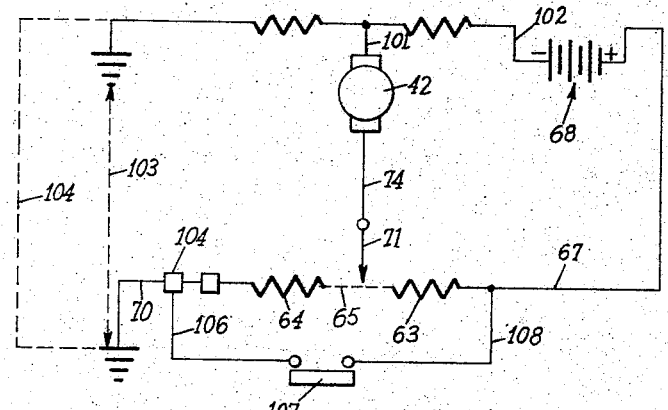
FIGURE 9 is a wiring diagram for the rheostat control.

The rheostat control is also mounted within the rearward compartment 27, being secured to a mounting bracket 61 extending between partition 29 and rear wall 20 of the housing. Referring to FIGURE 5, the rheostat 62 has a circular body the periphery of which is provided with a first set of windings 63 which comprise the "on" or running portion of the rheostat; and it has a second set of windings 64 which comprise a brake, the two sets of windings being separated by a blank segment 65 which is the "off" position. A terminal 66 connects the windings 63 to a conductor 67 which, as will be seen in FIGURE 9, is connected to the positive side of battery 68. Similarly, a terminal 69 connects windings 64 to a conductor 70 which, as will be explained more fully hereinafter, comprises a part of the brake circuit. A rotatable contact 71 is mounted centrally of the rheostat 62 on a rotatable shaft 72, the conductor being operatively connected to terminal 73 and conductor 74 which is connected to one of the windings of motor 42, which preferably comprises a 12 volt reversible D.C. series motor.

Figure 6:
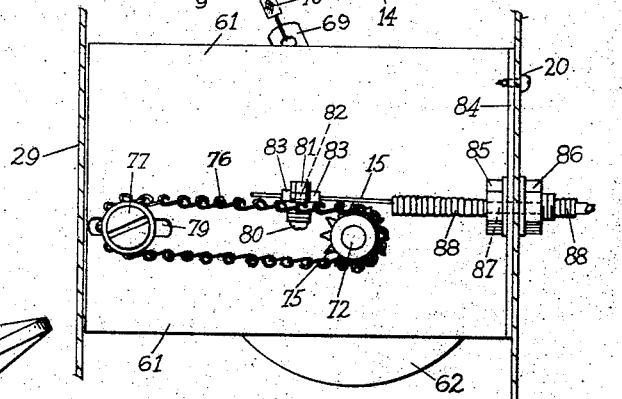
FIGURE 6 is an enlarged fragmentary sectional view taken along the line 6—6 of FIGURE 3.

The manner in which the rotatable contact 71 is turned can be best seen from FIGURE 6 wherein it will be seen that the shaft 72 extends through mounting bracket 61 where it receives a small sprocket 75 around which a link chain 76 extends, the link chain also passing around a stud 77 secured to the mounting bracket 61, as by means of bolt 78 seen in FIGURE 5, the stud passing through an elongated slot 79 oriented so as to permit take-up of any slack in the link chain. Reciprocal movement of the shaft 72 is effected through chain 76 by means of linkage 80 which comprises a stud mounting a head 81 having a transverse bore 82 through which the cable 15 extends, the cable 15 being secured to the head 81 by means of collars 83 locked to the cable on each side of the head. With this arrangement the cable is free to turn and twist relative to the linkage 80; and yet axial movement of the cable will result in corresponding movement of the upper flight of link chain 76, thereby causing sprocket 75 to rotate, such movement causing shaft 72 to rotate and hence turn contact 71.

The mounting bracket 61 is secured to the rear wall 20 of the housing by means of flange 84 and bolt 85 the shank of which passes through both the flange and wall where it is secured by means of nut 86. The bolt 85 also serves as a means to introduce the cable 15 into the housing; and to this end the shank of the bolt has a threaded bore, indicated at 87, which extends completely through the shank and head of the bolt, the threaded bore being of a size to enter into loose threaded engagement with the wire wound sheath 88 surrounding the cable 15, such cable being of the type generally known as a Bowden cable wherein the cable itself is axially displaceable relative to its surrounding sheath. With this arrangement, by loosening the nut 86 and then rotating the bolt 85, the sheath 88 may be adjusted axially and the enclosed cable 15 will be adjusted by an equal amount.

At the same time, the sheath is free to rotate—due to the loose threaded engagement—so that it too will be free from undesirable twisting.

Figure 8:
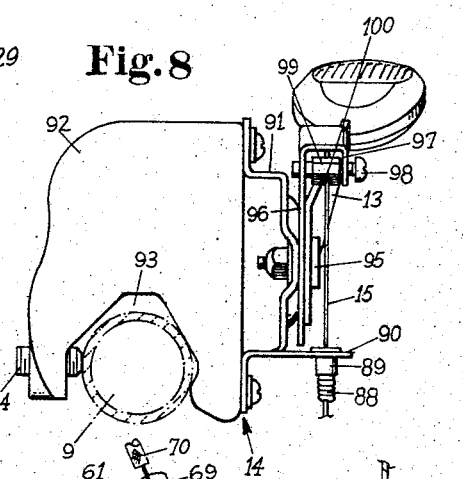
FIGURE 8 is a plan view of the control lever and associated mounting bracket.
Figure 7:
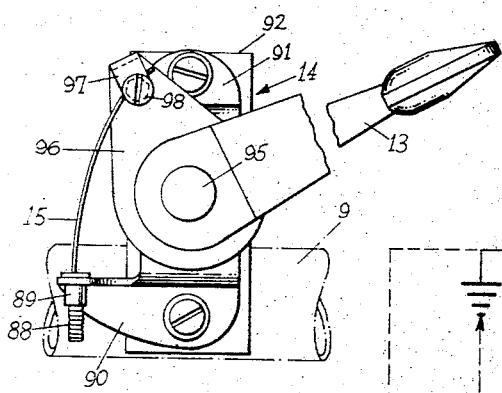
FIGURE 7 is a side elevational view of the control lever for operating the rheostat control.

Referring now to FIGURES 7 and 8 of the drawings, the opposite end of the cable 15 extends upwardly to the handle 9 of the cart where the sheath 88 is received in a sleeve 89 mounted on an arm 90 forming a part of a bracket 91 secured to a casting 92 having an angulated V-shaped opening 93 of a size to receive the handle 9, the handle being secured in the opening by means of setscrew 94. The lever arm 13 is pivotally mounted to bracket 91 by means of pivot pin 95; and the pivot pin also mounts an angularly related arm 96 which is operatively connected to the arm 13 for movement therewith, the arm 96 having a reversely bent ear 97 through which setscrew 98 extends into threaded engagement with a bored block 99 attached to arm 96. The end of the cable 15 passes through a transverse bore 100 in the block 99, the setscrew 98 acting to bind the cable to the block and hence to the arm 96. It will thus be apparent that by moving the lever arm 13, the cable 15 will be caused to move axially relative to its sheath 88 and, in so doing, its opposite end will act through the previously described link chain to move the rotatable contact of the rheostat.

The operation of the rheostat control will be best understood by reference to FIGURE 9 wherein it will be evident that when the movable contact 71 overlies the windings 63 a circuit will be formed to energize the motor, the motor winding being connected to the negative side of the battery through conductors 101 and 102. The motor circuit will, of course, be broken when the contact 71 is moved to the "off" position, as represented by the blank space 65.

When it is desired to provide a braking effect, as where the golf bag cart and power unit are moving down hill, the contact 71 is moved into engagement with the windings 64 which serves to short circuit the motor either through the frame of the golf bag cart or through a conductor provided for the purpose. To explain, the motor 42 is a reversible D.C. series motor. Only one of the windings of the reversible motor is used for driving the unit in the forward direction. Instead of using the other winding for driving the motor in the reverse direction, it is shorted and in so doing the motor is, in effect, turned into a generator by virtue of the residual magnetism. With the motor still turning in a forward direction, due to the direct connection between the driving wheels and the motor, and with the motor (now generator) terminals shorted through the frame of the golf cart, indicated by reference numeral 103, a braking effect is induced retarding the forward movement of the power unit. Alternatively, in lieu of shorting the braking circuit through the frame of the cart, a circuit 104 may be provided for this purpose.

Figure 10:
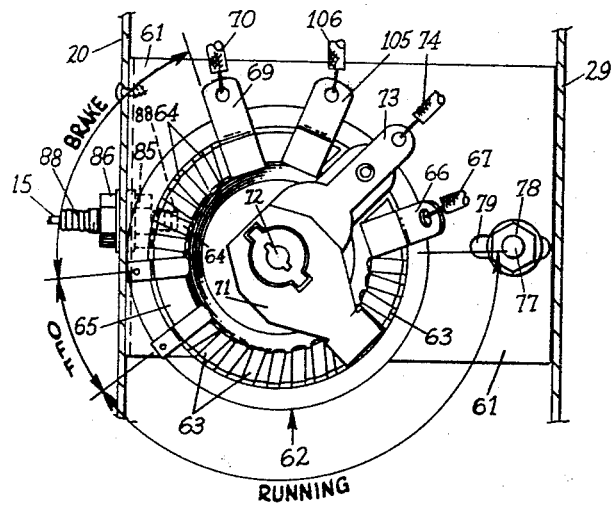
FIGURE 10 is an enlarged vertical sectional view similar to FIGURE 5 but illustrating an alternative form of rheostat control embodying a timer.

It is also within the spirit and purpose of the invention to provide a timer circuit as a part of the rheostat control so that the user may, if desired, establish a separate timer controlled running circuit so that the unit can be set to run for a predetermined time in a straight line without being attended by the user. Such timing circuit is made feasible by the guide wheel 16 which eliminates the necessity for the user to balance the cart on its two wheels during movement. Referring to FIGURE 10 which illustrates a modified form of rheostat, it will be noted that the rheostat embodies a separate contact 104 which is separated from the brake windings 64, the contact having a terminal 105 connected to a conductor 106. It will be evident that the rotatable contact 71 may be moved into engagement with the contact 104, thereby forming a circuit through timer 107 and conductor 108 to conductor 67, as will be seen from FIGURE 9 of the drawings.

Figure 4:
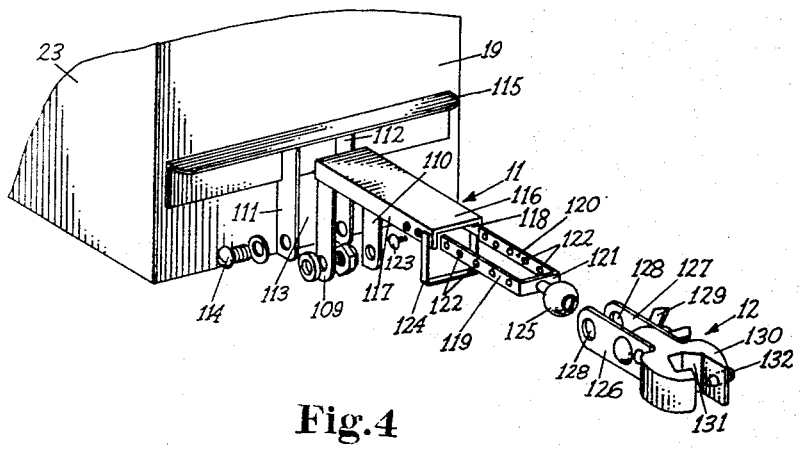
FIGURE 4 is a fragmentary exploded perspective view of the power unit.

Referring now to FIGURES 2 and 4 of the drawings, the tongue 11 is connected to the front wall 19 of the power unit housing by means of legs 109 and 110 which are pivotally connected at their lowermost ends to flanges 111 and 112 of a plate 113 secured to the wall 19, bolts 114 serving to connect the parts together. The length of the legs is such that the tongue will underlie an angle bar 115 also secured to the wall 19 of the housing. The tongue itself is formed from a U-shaped plate 116 having depending side flanges 117 and 118 which receive the opposite legs 119 and 120 of U-shaped extension 121. The legs of the extension are provided with pairs of spaced apart openings 122 by means of which the length of the extension may be adjusted by means of the sets of bolts 123 extending through the flanges 117 and 118 of tongue plate 116. The tongue plate is also provided with a U-shaped leg 124 which, when the tongue is pivoted so as to underlie the housing in the manner illustrated in dotted lines in FIGURE 2, contacts the bottom wall 21 of the housing, thereby providing a rest serving to maintain the power unit in essentially upright position.

A ball 125 is secured to the leading end of the extension 121, the ball being adapted to be received between the arms 126 and 127 of attachment bracket 12, the arms having openings 128 therein which engage opposite sides of the ball 125 when the thumbscrew 129 is tightened. As in the case of the mounting bracket 14, the attachment bracket is provided with a casting 130 having an angulated V-shaped opening 131 in which the main frame 1 of the cart is engaged, the attachment bracket being secured to the cart by means of the setscrew 132.

Figure 11:
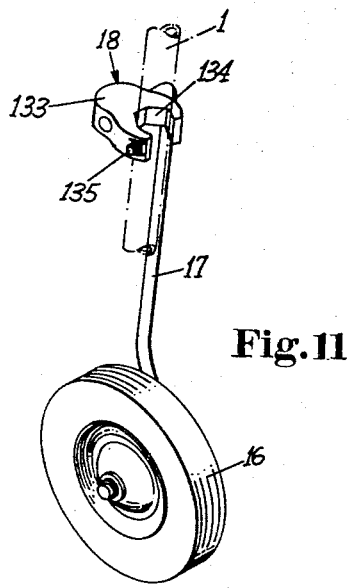
FIGURE 11 is a perspective view of the third wheel adapted to be mounted to the golf bag cart.

In similar fashion, the bracket 18 which secures the wheel 16 is also formed from a casting 133, as seen in FIGURE 11, having an angulated V-shaped opening 134 which engages about the main frame 1, the casting being held in place by the setscrew 135. Preferably, the setscrews in all three of the castings will be Allen screws of the same size; and the user will be provided with a single Allen wrench which will enable him to assemble and disassemble the brackets with respect to the cart with which the power unit is employed.

Modifications may be made in the invention without departing from its spirit and purpose. Various modifications have already been disclosed and others will undoubtedly occur to the skilled worker in the art upon reading this specification; and consequently it is not intended that the invention be limited in any way excepting as set forth in the claims which follow.

I claim:
1. In a power unit for a golf bag cart,
   a housing having front, rear, and opposing side walls, and a bottom,
   a main shaft extending crosswise of said housing and projecting outwardly beyond said opposing side walls, including bearing means rotatably journaling said main shaft to said opposing side walls, and a pair of wheels secured to the projecting ends of said shaft,
   a drive unit within said housing having a vertically disposed mounting plate, said mounting plate including a bearing block having a bore extending therethrough in which said main shaft is journaled, said drive unit being suspended from and supported by said main shaft, said drive unit including an electric motor mounted on said plate and gear means interconnecting said motor and said main shaft,
   circuit means for connecting said motor to a battery mounted within said housing, including rheostat means for controlling speed of said motor, and
   attachment means for operatively connecting said power unit to a golf bag cart.
2. In a power unit for a golf bag cart,
   a housing having front, rear, and opposing side walls, and a bottom, said housing having a transverse partition driving it interiorly into a forward compartment of a size to receive a battery and a rearward compartment of a size to house a drive unit and a rheostat control for said unit, with the battery in close proximity to but separated from the drive unit and rheostat control by said transverse partition, a main shaft extending transversely of said housing through the lowermost end of said rearward compartment and projecting outwardly beyond said opposing side walls, including bearing means rotatably journaling said main shaft to the opposing side walls of said housing, and a pair of wheels secured to the projecting ends of said shaft, a drive unit within said rearward compartment having a vertically disposed mounting plate including a bearing block having a bore extending therethrough in which said main shaft is journaled, said drive unit being suspended from and supported by said main shaft, said drive unit being otherwise free from attachment to said housing, said drive unit including an electric motor mounted on said plate and gear means interconnecting said motor and said main shaft, circuit means for connecting said motor to a battery mounted within said forward compartment, including rheostat means mounted within said rearward compartment for controlling the speed of said motor, and attachment means for operatively connecting said power unit to a golf bag cart.

3. The power unit claimed in claim 2 wherein said vertically disposed mounting plate is of a width less than the distance between the rear wall of said housing and the partition therein and is free to pivot on said main shaft from a position in which one of its side edges contacts said partition to a position in which its opposite side edge contacts the rear wall of said housing.

4. The power unit claimed in claim 3 wherein said mounting bracket includes bumper means projecting outwardly from its opposite side edges for selectively contacting the rear wall and partition, depending upon the pivoting movement of said mounting plate.

5. The power unit claimed in claim 2 wherein said motor overlies said bearing block, wherein said motor has a drive shaft projecting through said mounting plate, and wherein the gear means interconnecting said motor to said main shaft includes a first pulley mounted on said motor drive shaft, a second pulley mounted on a power shaft journaled in said bearing block, and an endless belt extending between said first and second pulleys, and means adjustably mounting said motor for movement toward and away from said bearing block, whereby the distance between said pulleys may be adjusted to take up slack in said belt and readily replace said belt when worn.

6. The power unit claimed in claim 2 wherein said rheostat means is secured to a bracket mounted within said rearward compartment, said rheostat means having a running position, an off position, and a braking position, and a contact arm selectively movable from one position to another, and cable means operatively connecting said contact arm to a control lever adapted to be mounted on the handle of the golf bag cart, whereby said rheostat means may be operated from a point remote from said housing.

7. The power unit claimed in claim 6 wherein said rheostat means includes a second running position, and wherein said circuit means includes a timer for opening and closing the circuit between the motor and battery when said contact arm of said rheostat means is in the second running position.

8. The power unit claimed in claim 6 wherein said motor is a reversible D.C. series motor having a plurality of windings, wherein one of said motor windings is energized by said circuit means to drive said motor when the contact arm of said rheostat is in the running positions, and wherein said first named motor winding is deenergized and another winding of said motor is effectively shorted when said arm is in the brake position.

9. The power unit claimed in claim 8 wherein said rheostat means is of circular configuration and said contact arm rotates in a circular path of travel, being mounted on a rotatable shaft, wherein said cable means comprises a cable axially displaceable within a sheath, and means operatively connecting said cable to the rotatable shaft of said movable arm.

10. The power unit claimed in claim 9 wherein the means interconnecting said cable and said contact arm includes a sprocket mounted on said shaft, an endless chain extending between said sprocket and an adjustable chain support lying in spaced relation to said sprocket about which said endless chain also travels, and means operatively connecting said cable to said chain at a point intermediate said sprocket and said support, with the cable extending in general parallel relation to the chain at their point of connection, whereby axial movement of said cable will effect a corresponding movement of said chain.

11. In a power unit for a golf bag cart,
a housing having a front, rear, and opposing side walls, and a bottom,
a main shaft extending crosswise of said housing and projecting outwardly beyond said opposing side walls, including bearing means rotatably journaling said main shaft to said opposing side walls, and a pair of wheels secured to the extending ends of said shaft,
a drive unit within said housing having a vertically disposed mounting plate, said mounting plate including a bearing block having a bore extending therethrough in which said main shaft is journaled, said drive unit being suspended from and supported by said main shaft, said drive unit including an electric motor mounted on said plate, and gear means interconnecting said motor and said main shaft,
circuit means for connecting said motor to a battery mounted within said housing, including rheostat means for controlling the speed of said motor, and
attachment means for operatively connecting said power unit to a golf bag cart, said attachment means comprising an elongated tongue pivotally connected at one of its ends to said housing, said tongue being pivotably movable from an extended position in which it projects forwardly from said housing to a collapsed position in which it underlies said housing and coacts with said wheels to support said power unit in essentially upright position.

12. The power unit claimed in claim 11 wherein said elongated tongue includes an extensible portion by means of which the length of said tongue may be adjusted, and mounting means engageable with the extensible end of said tongue for attaching said power unit to a golf bag cart.

13. The power unit claimed in claim 12 in combination with a golf bag cart having a main shaft supported by a pair of spaced apart wheels, bracket means at the opposite ends of said main shaft for supporting a golf bag, and a handle projecting outwardly from the uppermost end of said main frame, the mounting means on said extensible tongue being secured to the lowermost end of the main frame of said cart, and additional mounting means connected to the lowermost end of said main frame, said additional mounting means detachably mounting an arm carrying a guide wheel positioned to underlie the lowermost end of said main frame and coacting with the spaced apart wheels of the cart to support said cart for free running movement.

14. The power unit claimed in claim 13 including actuating means for said rheostat means mounted on the handle of the golf bag cart, said actuating means including a lever and a cable, said cable being connected at one end to said lever and at its opposite end to said rheostat means.

15. The power unit claimed in claim 14 wherein the mounting means connecting said power unit to the golf bag cart, the additional mounting means for said guide wheel, and the actuating means for said rheostat means each includes a casting having an angulated V-shaped opening for engagement with the golf bag cart, and screw means for releasably securing said castings to said cart.

References Cited

UNITED STATES PATENTS

| | | |
|---|---|---|
| 2,962,106 | 11/1960 | Burnside et al. _____ 180—19 |
| 3,059,713 | 10/1962 | Beggs. |
| 3,087,562 | 4/1963 | Harks _____ 180—11 |
| 3,117,648 | 1/1964 | Landreth. |
| 3,150,735 | 9/1964 | Kaufman. |

BENJAMIN HERSH, *Primary Examiner.*

J. A. PEKAR, *Assistant Examiner.*